(12) United States Patent
Günther et al.

(10) Patent No.: US 10,843,404 B2
(45) Date of Patent: Nov. 24, 2020

(54) PHENOLIC RESIN METHOD

(71) Applicant: Voxeljet AG, Friedberg (DE)

(72) Inventors: Daniel Günther, Munich (DE); Florian Mögele, Gessertshausen (DE)

(73) Assignee: VOXELJET AG, Friedberg (DE)

( * ) Notice: Subject to any disclaimer, the term of this patent is extended or adjusted under 35 U.S.C. 154(b) by 18 days.

(21) Appl. No.: 15/574,988

(22) PCT Filed: May 18, 2016

(86) PCT No.: PCT/DE2016/000209
§ 371 (c)(1),
(2) Date: Nov. 17, 2017

(87) PCT Pub. No.: WO2016/184448
PCT Pub. Date: Nov. 24, 2016

(65) Prior Publication Data
US 2018/0141271 A1    May 24, 2018

(30) Foreign Application Priority Data

May 20, 2015   (DE) .................. 10 2015 006 363

(51) Int. Cl.
*B29C 64/165* (2017.01)
*B29C 64/245* (2017.01)
*B33Y 10/00* (2015.01)
*B29K 86/00* (2006.01)

(52) U.S. Cl.
CPC .......... *B29C 64/165* (2017.08); *B29C 64/245* (2017.08); *B33Y 10/00* (2014.12); *B29K 2086/00* (2013.01)

(58) Field of Classification Search
CPC .................................................. B29C 64/165
See application file for complete search history.

(56) References Cited

U.S. PATENT DOCUMENTS

| 3,668,997 | A | 6/1972 | Ratowsky |
| 3,913,503 | A | 10/1975 | Becker |
| 4,247,508 | A | 1/1981 | Housholder |
| 4,575,330 | A | 3/1986 | Hull |
| 4,591,402 | A | 5/1986 | Evans et al. |
| 4,600,733 | A | 7/1986 | Ohashi et al. |

(Continued)

FOREIGN PATENT DOCUMENTS

| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Jason L Lazorcik
(74) *Attorney, Agent, or Firm* — The Dobrusin Law Firm, P.C.

(57) ABSTRACT

The invention relates to a method, a device, a binder system, and a material system for producing components using layering technology, wherein the temperature in the building space and/or in the applied material is set to at least 70° C. and maintained for at least 2 hours. Areas on which binder has been selectively applied, solidify and form the component.

17 Claims, 7 Drawing Sheets

(56) References Cited

U.S. PATENT DOCUMENTS

| | | | |
|---|---|---|---|
| 4,665,492 A | 5/1987 | Masters | |
| 4,669,634 A | 6/1987 | Leroux | |
| 4,711,669 A | 12/1987 | Paul et al. | |
| 4,752,352 A | 6/1988 | Feygin | |
| 4,752,498 A | 6/1988 | Fudim | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,031,120 A | 7/1991 | Pomerantz et al. | |
| 5,047,182 A | 9/1991 | Sundback et al. | |
| 5,053,090 A | 10/1991 | Beaman et al. | |
| 5,059,266 A | 10/1991 | Yamane et al. | |
| 5,076,869 A | 12/1991 | Bourell et al. | |
| 5,120,476 A | 6/1992 | Scholz | |
| 5,126,529 A | 6/1992 | Weiss et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A * | 4/1993 | Sachs | B05C 19/04 419/2 |
| 5,216,616 A | 6/1993 | Masters | |
| 5,229,209 A | 7/1993 | Gharapetian et al. | |
| 5,248,456 A | 8/1993 | Evans, Jr. et al. | |
| 5,252,264 A | 10/1993 | Forderhase et al. | |
| 5,263,130 A | 11/1993 | Pomerantz et al. | |
| 5,269,982 A | 12/1993 | Brotz | |
| 5,284,695 A | 2/1994 | Barlow et al. | |
| 5,296,062 A | 3/1994 | Bourell et al. | |
| 5,316,580 A | 5/1994 | Deckard | |
| 5,324,617 A | 6/1994 | Majima et al. | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A * | 2/1995 | Cima | B05C 19/04 264/69 |
| 5,398,193 A | 3/1995 | deAngelis | |
| 5,418,112 A | 5/1995 | Mirle et al. | |
| 5,427,722 A | 6/1995 | Fouts et al. | |
| 5,431,967 A | 7/1995 | Manthiram et al. | |
| 5,433,261 A | 7/1995 | Hinton | |
| 5,482,659 A | 1/1996 | Sauerhoefer | |
| 5,490,962 A | 2/1996 | Cima et al. | |
| 5,503,785 A | 4/1996 | Crump et al. | |
| 5,506,607 A | 4/1996 | Sanders, Jr. et al. | |
| 5,518,060 A | 5/1996 | Cleary et al. | |
| 5,518,680 A * | 5/1996 | Cima | A61F 2/105 264/401 |
| 5,555,176 A | 9/1996 | Menhennett et al. | |
| 5,573,721 A | 11/1996 | Gillette | |
| 5,589,222 A | 12/1996 | Thometzek et al. | |
| 5,597,589 A | 1/1997 | Deckard | |
| 5,616,294 A | 4/1997 | Deckard | |
| 5,616,631 A | 4/1997 | Kiuchi et al. | |
| 5,637,175 A | 6/1997 | Feygin et al. | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,665,401 A | 9/1997 | Serbin et al. | |
| 5,717,599 A | 2/1998 | Menhennett et al. | |
| 5,730,925 A | 3/1998 | Mattes et al. | |
| 5,740,051 A | 4/1998 | Sanders, Jr. et al. | |
| 5,747,105 A | 5/1998 | Haubert | |
| 5,749,041 A | 5/1998 | Lakshminarayan et al. | |
| 5,753,274 A | 5/1998 | Wilkening et al. | |
| 5,807,437 A | 9/1998 | Sachs et al. | |
| 5,824,250 A | 10/1998 | Whalen | |
| 5,837,960 A | 11/1998 | Lewis et al. | |
| 5,851,465 A | 12/1998 | Bredt | |
| 5,884,688 A | 3/1999 | Hinton et al. | |
| 5,902,441 A | 5/1999 | Bredt et al. | |
| 5,902,537 A | 5/1999 | Almquist et al. | |
| 5,904,889 A | 5/1999 | Serbin et al. | |
| 5,934,343 A | 8/1999 | Gaylo et al. | |
| 5,940,674 A | 8/1999 | Sachs et al. | |
| 5,943,235 A | 8/1999 | Earl et al. | |
| 5,989,476 A | 11/1999 | Lockard et al. | |
| 5,997,795 A | 12/1999 | Danforth | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,048,954 A | 4/2000 | Barlow et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,164,850 A | 12/2000 | Speakman | |
| 6,165,406 A | 12/2000 | Jang et al. | |
| 6,169,605 B1 | 1/2001 | Penn et al. | |
| 6,175,422 B1 | 1/2001 | Penn et al. | |
| 6,193,922 B1 | 2/2001 | Ederer | |
| 6,210,625 B1 | 4/2001 | Matsushita | |
| 6,216,508 B1 | 4/2001 | Matsubara et al. | |
| 6,217,816 B1 | 4/2001 | Tang | |
| 6,243,616 B1 | 6/2001 | Droscher et al. | |
| 6,259,962 B1 | 7/2001 | Gothait | |
| 6,270,335 B2 | 8/2001 | Leyden et al. | |
| 6,305,769 B1 | 10/2001 | Thayer et al. | |
| 6,316,060 B1 | 11/2001 | Elvidge et al. | |
| 6,318,418 B1 | 11/2001 | Grossmann et al. | |
| 6,335,052 B1 | 1/2002 | Suzuki et al. | |
| 6,335,097 B1 | 1/2002 | Otsuka et al. | |
| 6,350,495 B1 | 2/2002 | Schriener et al. | |
| 6,355,196 B1 | 3/2002 | Kotnis et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,405,095 B1 | 6/2002 | Jang et al. | |
| 6,416,850 B1 | 7/2002 | Bredt et al. | |
| 6,423,255 B1 | 7/2002 | Hoechsmann et al. | |
| 6,460,979 B1 | 10/2002 | Heinzl et al. | |
| 6,476,122 B1 | 11/2002 | Leyden | |
| 6,485,831 B1 | 11/2002 | Fukushima et al. | |
| 6,500,378 B1 | 12/2002 | Smith | |
| 6,554,600 B1 | 4/2003 | Hofmann et al. | |
| 6,596,224 B1 | 7/2003 | Sachs et al. | |
| 6,610,429 B2 | 8/2003 | Bredt et al. | |
| 6,616,030 B2 | 9/2003 | Miller | |
| 6,649,121 B1 | 11/2003 | Hamamoto | |
| 6,658,314 B1 | 12/2003 | Gothait | |
| 6,672,343 B1 | 1/2004 | Perret et al. | |
| 6,713,125 B1 | 3/2004 | Sherwood et al. | |
| 6,722,872 B1 | 4/2004 | Swanson et al. | |
| 6,733,528 B2 | 5/2004 | Abe et al. | |
| 6,742,456 B1 | 6/2004 | Kasperchik et al. | |
| 6,764,636 B1 | 7/2004 | Allanic et al. | |
| 6,827,988 B2 | 12/2004 | Krause et al. | |
| 6,830,643 B1 | 12/2004 | Hayes | |
| 6,838,035 B1 | 1/2005 | Ederer et al. | |
| 6,855,205 B2 | 2/2005 | McQuate et al. | |
| 6,896,839 B2 | 5/2005 | Kubo et al. | |
| 6,905,645 B2 | 6/2005 | Iskra | |
| 6,972,115 B1 | 12/2005 | Ballard | |
| 6,989,115 B2 | 1/2006 | Russell et al. | |
| 7,004,222 B2 | 2/2006 | Ederer et al. | |
| 7,037,382 B2 | 5/2006 | Davidson et al. | |
| 7,048,530 B2 | 5/2006 | Gaillard et al. | |
| 7,049,363 B2 | 5/2006 | Shen | |
| 7,087,109 B2 | 8/2006 | Bredt et al. | |
| 7,120,512 B2 | 10/2006 | Kramer et al. | |
| 7,137,431 B2 | 11/2006 | Ederer et al. | |
| 7,153,463 B2 | 12/2006 | Leuterer et al. | |

(56) References Cited

U.S. PATENT DOCUMENTS

| | | | |
|---|---|---|---|
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,515,986 B2 * | 4/2009 | Huskamp ............ G05D 23/1919 700/207 |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,790,096 B2 | 9/2010 | Merot et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 * | 6/2014 | Ederer ..................... B22C 9/00 264/113 |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 9,808,993 B2 * | 11/2017 | Boydston .............. B29C 64/171 |
| 10,315,357 B2 * | 6/2019 | Riman ................. C04B 35/6269 |
| 10,632,672 B2 * | 4/2020 | Vilajosana ............ B33Y 40/00 |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0093115 A1 * | 7/2002 | Jang ....................... B33Y 30/00 264/113 |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2002/0182351 A1 | 12/2002 | Akiyama et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0005182 A1 * | 1/2004 | Gaylo .................... B22F 3/1055 400/283 |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0046067 A1 | 3/2005 | Oriakhi |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0012058 A1 | 1/2006 | Hasei |
| 2006/0013659 A1 | 1/2006 | Pfeiffer et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni et al. |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0069994 A1 | 3/2008 | Kanda |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2009/0283501 A1 | 11/2009 | Erikson et al. |
| 2010/0007048 A1 | 1/2010 | Schweininger |
| 2010/0007062 A1 | 1/2010 | Larsson et al. |
| 2010/0026743 A1 | 2/2010 | Van Thillo et al. |

(56) References Cited

U.S. PATENT DOCUMENTS

| | | |
|---|---|---|
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |
| 2011/0059247 A1* | 3/2011 | Kuzusako .............. B22C 9/00 427/372.2 |
| 2011/0177188 A1 | 7/2011 | Bredt et al. |
| 2011/0223437 A1 | 9/2011 | Ederer et al. |
| 2011/0300248 A1* | 12/2011 | Tung .................... B29C 64/20 425/90 |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0065194 A1 | 3/2014 | Yoo |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0251352 A1* | 9/2015 | Goto .................... B29C 64/165 428/413 |
| 2015/0266238 A1 | 9/2015 | Ederer et al. |
| 2015/0273572 A1* | 10/2015 | Ederer .................. B29C 64/171 164/15 |
| 2015/0290881 A1 | 10/2015 | Ederer et al. |
| 2015/0291921 A1* | 10/2015 | Rives .................... B33Y 30/00 425/130 |
| 2015/0308741 A1* | 10/2015 | Chen .................... F26B 25/04 34/553 |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0151840 A1* | 6/2016 | McCoy ................. B29C 64/165 425/78 |
| 2016/0257843 A1* | 9/2016 | Boydston ............. C08G 67/02 |
| 2016/0263828 A1* | 9/2016 | Ederer .................. B33Y 30/00 |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2016/0339602 A1* | 11/2016 | Kato .................... B29C 64/165 |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0145155 A1* | 5/2017 | Wright ................. B33Y 70/00 |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0203514 A1* | 7/2017 | McCoy ................. B29C 35/045 |
| 2017/0210037 A1 | 7/2017 | Ederer et al. |
| 2017/0217098 A1 | 8/2017 | Hartmann et al. |
| 2017/0217104 A1* | 8/2017 | Cortes I Herms ..... G05D 23/27 |
| 2017/0239889 A1* | 8/2017 | Ganapathiappan ... B29C 64/165 |
| 2017/0252974 A1* | 9/2017 | Ng ....................... B33Y 30/00 |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1* | 12/2017 | Ederer .................. B29C 64/165 |
| 2017/0368748 A1* | 12/2017 | De Pena ............... B33Y 10/00 |
| 2018/0015664 A1* | 1/2018 | Kabalnov .............. B41M 3/00 |
| 2018/0079133 A1 | 3/2018 | Ederer et al. |
| 2018/0133975 A1* | 5/2018 | Zhao .................... B29C 65/1429 |
| 2018/0141271 A1 | 5/2018 | Gunther et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Gunther et al. |
| 2018/0229428 A1* | 8/2018 | Takano ................. B29C 64/393 |
| 2018/0272601 A1* | 9/2018 | Erickson .............. B33Y 10/00 |
| 2018/0304527 A1* | 10/2018 | Paternoster ........... B29C 64/20 |
| 2018/0319078 A1 | 11/2018 | Ederer et al. |
| 2018/0326654 A1 | 11/2018 | Ederer et al. |
| 2018/0326662 A1 | 11/2018 | Gunther et al. |
| 2018/0333781 A1 | 11/2018 | Ederer et al. |
| 2018/0345585 A1 | 12/2018 | Ederer et al. |
| 2018/0369910 A1 | 12/2018 | Gunter et al. |
| 2019/0047216 A1* | 2/2019 | Emamjomeh ......... C09D 11/38 |
| 2019/0084229 A1 | 3/2019 | Gunther |
| 2019/0111486 A1 | 4/2019 | Ederer et al. |
| 2019/0143608 A1 | 5/2019 | Ederer et al. |
| 2019/0143665 A1 | 5/2019 | Ederer |
| 2019/0160740 A1 | 5/2019 | Ederer et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 | 2/1995 |
| DE | 29506204 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 10 2006 040 305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| DE | 102012020000 A1 | 4/2014 |
| DE | 102015006363 A1 | 12/2016 |
| DE | 102015008860 A1 | 1/2017 |

(56) References Cited

FOREIGN PATENT DOCUMENTS

| | | |
|---|---|---|
| DE | 102015011503 A1 | 3/2017 |
| DE | 102015011790 A1 | 3/2017 |
| EP | 0361847 B1 | 4/1990 |
| EP | 0431924 A2 | 1/1996 |
| EP | 1381504 B1 | 1/2004 |
| EP | 1415792 | 5/2004 |
| EP | 1457590 A | 9/2004 |
| GB | 2297516 A | 8/1996 |
| JP | S62275734 A | 11/1987 |
| JP | 2003136605 A | 5/2003 |
| JP | 2004082206 A | 3/2004 |
| JP | 2009202451 A | 9/2009 |
| WO | 90/03893 A1 | 4/1990 |
| WO | 01/34371 A2 | 5/2001 |
| WO | 01/40866 A2 | 6/2001 |
| WO | 01/078969 A2 | 10/2001 |
| WO | 02/26419 A1 | 4/2002 |
| WO | 2004/014637 A1 | 2/2004 |
| WO | 2006/100166 A1 | 9/2006 |
| WO | 2007/114895 A2 | 10/2007 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2013/174361 A1 | 11/2013 |
| WO | 2014/090207 A1 | 6/2014 |
| WO | 2014/166469 A1 | 10/2014 |
| WO | 2015/062569 A1 | 5/2015 |
| WO | 2015/078430 A1 | 6/2015 |
| WO | 2015/081926 A1 | 6/2015 |
| WO | 2015/085983 A2 | 6/2015 |
| WO | 2015/090265 A1 | 6/2015 |
| WO | 2015/090567 A1 | 6/2015 |
| WO | 2015/096826 A1 | 7/2015 |
| WO | 2015/149742 A1 | 10/2015 |
| WO | 2015/180703 A1 | 12/2015 |
| WO | 2016/019937 A1 | 2/2016 |
| WO | 2016/019942 A1 | 2/2016 |
| WO | 2016/058577 A1 | 4/2016 |
| WO | 2016/095888 A1 | 6/2016 |
| WO | 2016/101942 A1 | 6/2016 |
| WO | 2016/146095 A1 | 9/2016 |

OTHER PUBLICATIONS

Plenco (https://web.archive.org/web/20100918042707/https://www.plenco.com/phenolic-novolac-resol-resins.htm; Sep. 18, 2010).*
International Search Report, Application No. PCT/DE2016/000209, dated Sep. 5, 2016.
Written Opinion of the International Search Authority, Application No. PCT/DE2016/000209, dated Sep. 5, 2016.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep., 1995, p. 130-133.
Gebhart, Rapid Prototyping, pp. 118-119, 1996.
Joel Segal, Feature Article—Rapid Tooling—Cast Resin and Sprayed Metal Tooling by, Dated Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxelj et' s VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner

PHENOLIC RESIN METHOD

CLAIM OF PRIORITY

This application is a national phase filing under 35 USC § 371 from PCT Application serial number PCT/DE2016/000209 filed on May 18, 2016, and claims priority therefrom. This application further claims priority from German Patent Application DE 10 2015 006 363.4 filed on May 20, 2015. PCT/DE2016/000209 and DE 10 2015 006 363.4 are each incorporated herein by reference in its entirety.

The invention relates to a method and a device for producing three-dimensional components. These moulded parts are suitable for use in casting applications, in particular as moulds and cores.

European Patent EP 0 431 924 B1 describes a process for producing three-dimensional objects based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object (component).

Upon completion, the object made of solidified particulate material is embedded in loose particulate material, from which it is subsequently freed. For this purpose a suction device may be used, for example. This leaves the desired objects which then have to be freed from any residual powder, e.g. by brushing it off.

Problems occur in known methods with respect to the binders used, which often attack the device itself and, in particular, the print head and are in some cases problematic from a health perspective, too.

Also, the further process conditions may be problematic and suboptimal for the production of advantageous components. In particular, the temperature distribution and suitable binders do not always allow positive process results and often adversely affect economic viability.

Therefore, it was an object of the present invention to provide a method by which advantageous component can be produced and which is advantageous in terms of economic viability, or which at least avoids or at least reduces the disadvantages of the prior art.

BRIEF DESCRIPTION

What is described is a method for the layered construction of components, wherein a particulate material is applied onto a construction area in a construction space layer by layer with a layer thickness, a binder is selectively applied, the temperature in the construction space or/and in the particulate material applied is adjusted to a desired temperature, and the steps of material application and binder application are repeated until a desired component is obtained, wherein the temperature in the construction space or/and in the material applied is adjusted to at least 70° C. and maintained for at least 2 hours, with the areas onto which the binder was selectively applied solidifying and forming the component.

In this context, it is advantageous that an unproblematic binder system can be used, which is water- or alcohol-based as a solvent and which is adjusted to and kept at a temperature of at least 70° C. in the applied particulate material over a long period of time. This has the advantage that, using this method, a very large area in the applied particulate material thus maintains a homogeneous desired temperature, which in turn allows uniform solidification and advantageous component properties to be obtained. This has the advantage not only that homogeneous material properties are achieved in the component, but also that, advantageously, a large area of the construction space can be used to produce components and the unused edge region of the construction space provided with particulate material remains relatively small. This increases the efficiency of the device and thereby reduces the cost per component or high-volume component, respectively. The binder system used in the method is preferably only slightly reactive at room temperature and the machine parts and, in particular, the print head are easy to clean and allow maintenance without any notable problems.

BRIEF DESCRIPTION OF THE DRAWINGS

FIGS. 4a-4d describe the sequence of the binder penetrating into the particulate material.

FIG. 5: FIG. 5c shows the situation in the disclosed method, and it becomes evident that the useful construction space or the useful applied powder cake, respectively, is much greater which results in increased economic viability of the machine, and at the same time, the properties of the component may be advantageous. This is shown by isothermal line 510, which includes a large area that is kept homogeneous in its temperature during the process and thus yields positive process results.

DETAILED DESCRIPTION

In the following, several terms will be defined more precisely. Otherwise, the terms used shall have the meanings known to the person skilled in the art.

In the sense of the invention, "3D printing methods" are all methods known from the prior art which enable the construction of components in three-dimensional moulds and are compatible with the described process components and devices. In particular, these include powder-based methods, containing as one ingredient aqueous solutions or/and other fluid components or solvents which have to be extracted from the moulded part or escape from the moulded part during or for its solidification. The solidification and quality of the moulded part can be selectively influenced by the invention, with other quality features remaining unchanged or even being positively influenced.

A "moulded part", "model", "3D moulded part" or "component" in the sense of the invention means all three-dimensional objects manufactured by means of the method according to the invention or/and the device according to the invention which exhibit dimensional stability.

The "device" used for carrying out the method according to the invention may be any known 3D-printing device which includes the required parts. Common components include a coater, a construction field, means for moving the construction field or other components, a dosage device, a print head, a heating medium, displacement means for batch-wise or continuous processes, and other components which are known to the person skilled in the art and will therefore not be described in detail herein.

A "construction platform" or "construction area" moves, according to the disclosure, with respect to the printing and coater level. This relative movement takes place during the construction process in interrupted movements in layer thickness. The movement defines the layer thickness. As an alternative, the device may be configured such that the other parts of the device move upwards, thereby adjusting the layer strength or layer thickness.

A "construction container" or "job box" provides a construction space. Accordingly, it has a bottom, walls and an open access area, the construction space. The construction container always comprises parts which do not move relative to the frame of the 3D printing device. Exchangeable construction containers, known as job boxes, allow virtually constant operation of the machine, because the job boxes can be moved in and out of the machine. The parts of a first construction operation can thus be unpacked outside the device (3D printing device), while new parts can already be printed in a second construction container within the machine.

A "construction space" in the sense of the invention is the geometric location where the particulate material bed grows during the construction process by repeated coating with particulate material. The construction space is generally bounded by a bottom, i.e. the construction platform, by walls and an open top surface, i.e. the construction plane. The construction plane may be horizontal, but may also form an angle, for example, in continuous processes, so that coating is performed obliquely, at an angle.

The "particle materials" or "construction materials" "or particulate material" of use herein may be any materials known for powder-based 3D printing, in particular sands, ceramic powders, metal powders, plastic materials, wood particles, fibre materials, celluloses or/and lactose powders. The particulate material is preferably a free-flowing powder when dry, but a cohesive, cut-resistant powder may also be used. In a preferred aspect, the particulate material used may be considered a "passive powder material", because it is not directly involved in the binding reaction, i.e. solidification, of the component, but is merely solidified or "connected" by the binder system into a solid component. It may display inert behaviour. The applied particulate material may also be referred to as powder cake.

"Adjusting the temperature" or "tempering" means that a specific temperature is adjusted in the construction space or/and the applied particulate material or that the construction space is adjusted to a selected temperature. In one aspect, the applied particulate material is tempered, in particular, and the temperature is maintained, for example, at approx. 60, 70, 80, 90, 100, 110, 120, 130, 140, 150° C., or 80 to 100° C.

A "binder" or "binder system" is the material which is selectively applied onto the particulate material by means of the print head and which leads to solidification and, thus, the production of the component. The binder system comprises a solvent and further components, e.g. monomers, oligomers and/or polymers. The binding mechanism is a polymerization reaction. This results in a solid material which is capable of binding the particles in the powder. As the basic material, a pre-polymeric phenolic resin is preferred.

The "diffusion length" corresponds to the expansion of an applied binder in the particulate material and is influenced, inter alia, by the volume, temperature and composition of the binder.

Preferred embodiments will be described below.

What is disclosed is a method for the layered construction of components, wherein a particulate material is applied onto a construction area in a construction space layer by layer with a layer thickness, a binder is selectively applied, the temperature in the construction space or/and in the particulate material applied is adjusted to a desired temperature, and the steps of material application and binder application are repeated until a desired component is obtained, wherein the temperature in the construction space or/and in the material applied is adjusted to at least 70° C. and maintained for at least 2 hours, with the areas onto which the binder was selectively applied solidifying and forming the component.

Using the method disclosed herein, components are produced, on the one hand, which exhibit positive material properties, and on the other hand, the disclosed method allows the effective space within the applied powder cake to be increased, because a constant temperature, necessary for the duration required for the reaction, can be adjusted and maintained.

The temperature is selected such that the reaction temperature required for the solidification with positive component properties is set to be homogeneous in the powder cake. Preferably, the temperature is adjusted to 70 to 90° C., preferably at least 80° C., more preferably at least 90° C., still more preferably 80 to 150° C., and even more preferably 80 to 100° C. This is also referred to as an isothermal line, and an isothermal line of 80° C., preferably 90° C., is preferred.

In this manner, a substantially homogeneous temperature is adjusted and maintained in an advantageously large area of the powder cake, i.e. in an area of the applied particulate material.

In the method, the temperature is maintained over a period required for the reaction, preferably for 3 to 10 hours, more preferably for 4 to 6 hours, and still more preferably for at least 4 hours.

Use can be made of any suitable particulate materials known to the person skilled in the art, the particulate material preferably being a plastic material, a sand, a ceramic material or a metal. In this case, the particle size may be selected as required in conjunction with the other process parameters. Preferably, the average grain size is at least 8 µm, more preferably 10 µm to 1 mm.

The particulate material may be applied in different layer thicknesses, with a layer thickness of 50 to 800 µm being preferred.

The binder is adapted to the other process materials and conditions, and the binder used may preferably be a binder system comprising monomers, oligomers or/and polymers and a solvent, said solvent preferably being an aqueous or alcoholic solvent.

The component obtained by the method preferably has a green strength in the component of at least 280 N/cm².

The method allows a final strength (bending strength) in the component of at least 300, preferably at least 500 N/cm², to be achieved either directly or after further process steps.

In the method, the process conditions are set such that the component produced thereby has a loss on ignition of less than 3%, preferably less than 2.5%, more preferably less than 2.2%.

Further process steps are possible; the resulting component can be subjected to further processing steps.

In another aspect, the disclosure relates to a binder system comprising monomers, oligomers or/and polymers and a solvent, said solvent preferably being an aqueous or alcoholic solvent. The binder system preferably comprises a pre-polymeric phenolic resin.

In another aspect, the disclosure relates to a material system comprising a particulate material as described above and a binder system as described above.

In another aspect, the disclosure relates to a device for producing a component, said device comprising a construction space with a construction platform, means for applying a particulate material, means for selectively applying a binder system, means for adjusting a temperature in the construction space or/and the particulate material. Further aspects of the invention will be presented in more detail below, and these device elements can be combined with each other in any useful and functional manner desired.

Finally, in another aspect, the disclosure relates to a solid body (component) produced by means of a method, a binder system, by means of a material system or/and a device as described herein, wherein the solid body preferably has a bending strength of 500 N/cm².

Further aspects will be described below.

One aspect of the method is a binding agent system or binder (400), which is printed on a powder (401) that is neutral with regard to the reaction and cures at a substantially higher temperature than room temperature over several hours. The majority of said curing takes place during the construction process. In this case, the entire resulting powder cake is kept warm for hours.

Various particulate materials (401) can be used as the powder. This includes ceramic powders, sand or even metal powders. For the method, the powder grains (401) should not be substantially smaller than 10 μm. Particles (401) greater than 1 mm generally make safe processing difficult. These statements refer to the average grain size. However, considerable parts of the aforementioned maximum and minimum grains (401) are detrimental to the process even if the average grain size requirements are met.

Figure 1:
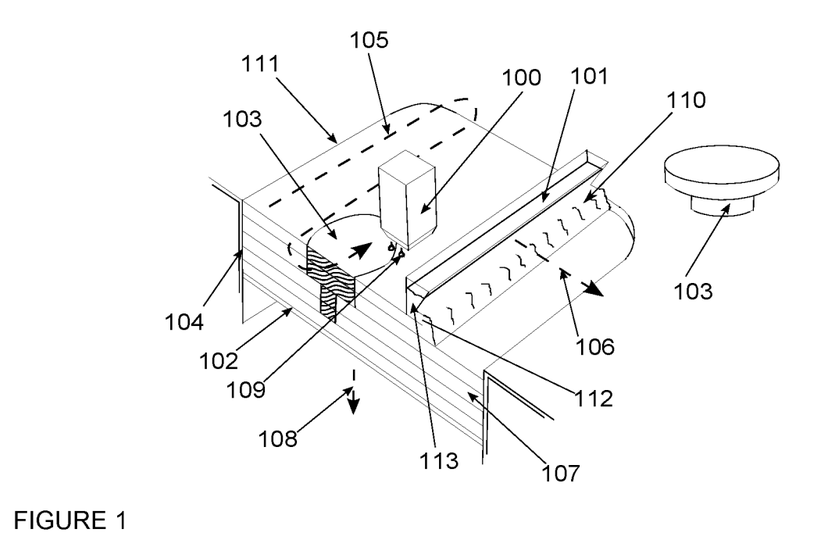
FIG. 1: A schematic representation of the components of a powder-based 3D printer in an oblique sectional view.
Figure 2:
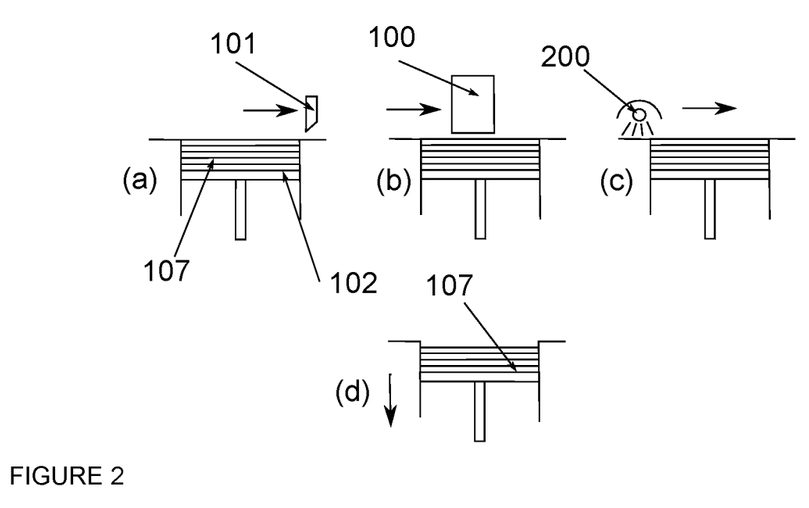
FIG. 2: Sequence of a conventional 3D printing process using layer-wise radiation curing.
Figure 3:
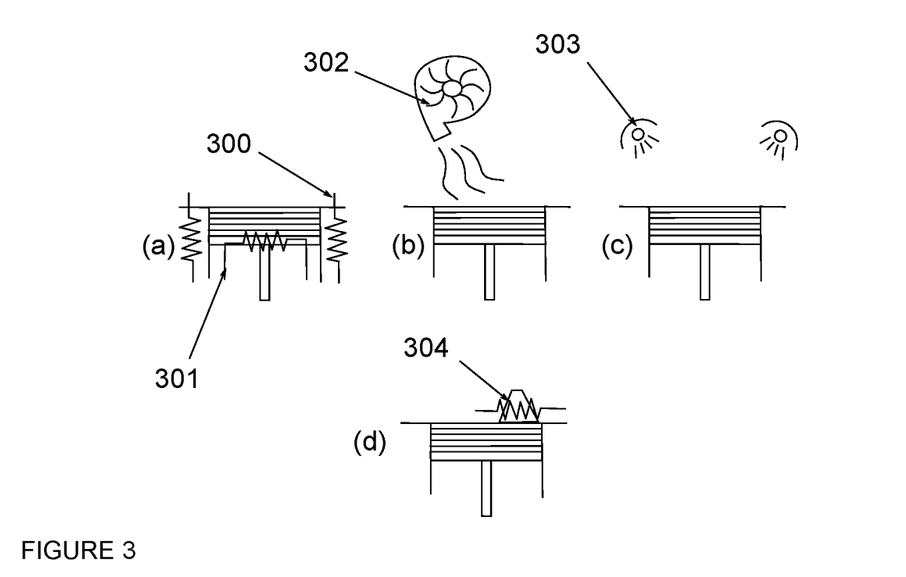
FIG. 3: Sequence of a construction process comprising radiation curing which is not effected in every layer.

The particles are processed in the device into a thin layer (107) by a coater (101) in conjunction with the construction platform (102). For this purpose, the particulate material (401) is supplied at or from a starting position and smoothed by the coater (101) moving over the construction field. The respective position of the construction platform determines the layer thickness.

In a resin system or binder (400) according to the invention, the powder cake is kept at a temperature of 80° C. for at least 4 hours. This results in a bending strength in the components of over 300 N/cm² with a loss on ignition of less than 2.2%.

Figure 4:
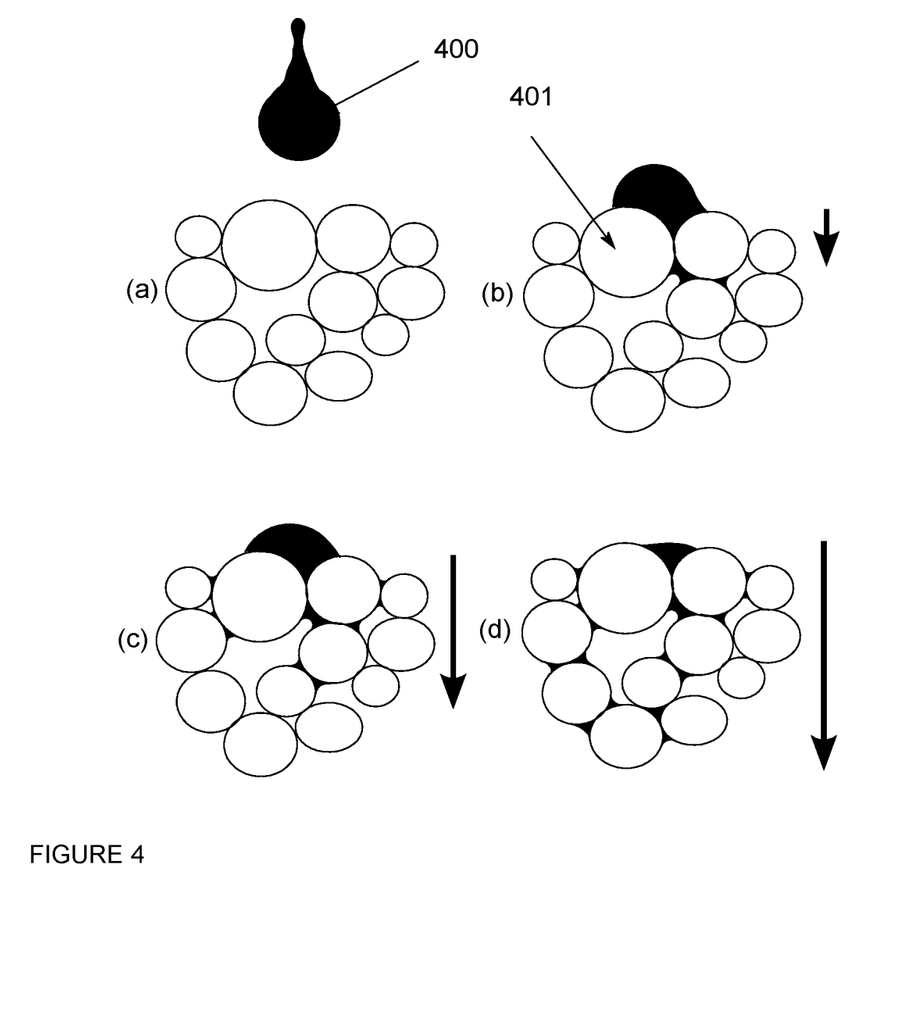
FIG. 4: A schematic representation of the application of binder (400) onto the supplied particulate material, wherein (401) represents one particle and the dark arrow indicates the direction of penetration. In this case, the strength of the component is obtained by the binder bonding the particles of the particulate material and curing of the binder taking place, which results in a solid connection of the binder with the particulate material.

The binder system (400) includes monomers, oligomers and/or polymers as binding ingredients. These are solved in a solvent. The binding mechanism is a polymerization reaction. It results in a solid material which is capable of binding the particles in the powder. As the basic material, a pre-polymeric phenolic resin is preferred.

According to the invention, the binder system (400) is configured for use in inkjet print heads (100) comprising piezo elements. In this case, its viscosity ranges from 5 to 20 mPas. Steam pressure is less than 3,000 Pa at room temperature. Surface tension is in the range of from 30-50 mN/m. The binder system is adjusted such that it takes at least approx. 1 minute for the reversible drying-up of the print head to hinder the function of first jets.

The binder system (400) exhibits extremely low reactivity at room temperature. This protects the print head (100), which remains highly reliable even after a long service life. Dried binder is easy to remove at room temperature even after weeks. This facilitates both cleaning of the device and reactivation of dried-up jets.

In the case of phenolic resins, the solvent for the binder system may be water. Therefore, the binder system can be regarded as hardly noxious if handled properly.

Due to the heating effect of the hot construction field surface, the print head (100) is cooled actively or passively, allowing the drop mass and, thus, the input to be kept constant throughout the construction process. Passive cooling may be effected by contact with the print head cleaning unit. Active cooling may be achieved, for example, by a cooling element through which cooling water flows and which is mounted to the print head (100). The introduction of pre-cooled compressed air, and also a fan, are suitable for cooling.

Upon reaching the surface of the particulate material, the binder printed by the print head (100) penetrates slowly into the powder cake as a function of the surface tension. In this case, a certain diffusion length is desired. Said diffusion is necessary to bond the individual layers with each other. The diffusion length depends on the fluid parameters, but also on the temperature on the construction field. Moreover, the temperature is controlled such during construction that the printed layers cure slowly, thus allowing interlaminar bonding.

For example, if water is used as the solvent, it is advantageous to work below 100° C. Above this limit, evaporation effects occur which may adversely affect the surface quality of the components.

It is advantageous for the process to set a diffusion length of 1.5 times the layer thickness. This results in a good compromise between anisotropy in the direction of construction, resolution and quality of the bottom surfaces of the component.

In this process, layer thicknesses of 50-800 μm are possible and useful. They are adjusted according to the powder material and the desired construction progress.

Figure 5:
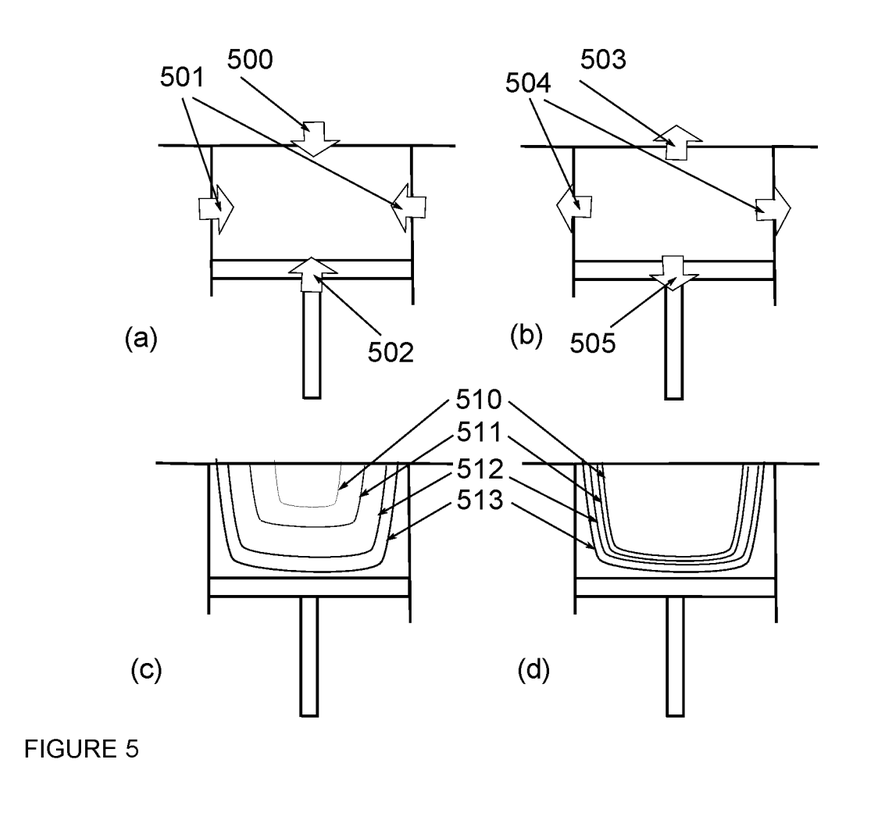
FIGS. 5a and 5b show the energy input/heat input (500, 501, 502) and the energy loss/heat loss (503, 504, 505), respectively.
FIG. 5c shows very inhomogeneous temperature distribution, and in this case, the isothermal lines (510-514) within which a solidification reaction is bound to happen, are shifted far towards the centre of the construction container. This considerably reduces the useful construction space, and the economic viability of the device and the method is disadvantageous.

The device comprises means (200, 300-304) for heating the powder cake and keeping it warm. In this case, the energy input can be partly insulated by the powder, so that powder once heated up cannot cool off rapidly.

Infrared heat sources can be used as the heating means. They may be arranged statically (302) above the construction field or moved (200) over the construction field by moving parts of the device. Halogen radiators made of quartz glass as well as ceramic radiators are suitable. Mirrors for IR radiation are also suitable to influence and control the heat balance.

For example, an IR radiator with a maximum power of 9.5 kW and a length of one metre can be used to heat a construction field of 100×60 cm. In this case, the radiator is moved back and forth over the construction field, for example, at a speed of 0.05 m/s. This process is usually combined with the coating process. For a coating time of approx. 60 sec., which results substantially from printing and irradiation, over 90° C. may be reached in the powder cake during the construction process. As an alternative, a separate irradiation passage carried out x times every n layers may be used in addition to the described irradiation and/or as the only heating routine, with n≥2, preferably every 2 to 5 layers, particularly preferably every 3 layers, and with x≥1 irradiation, preferably 2 to 5, particularly preferably 3 to 4 irradiations.

Also, hot air may sweep (301) over the construction field and thereby heat it up. All forms of hot air blowers (301) are suitable for this purpose. Direct preheating of the powder with an air stream or a resistance heating is also possible. Also, a contacting, heated metal may be guided over the powder (304) to heat it up.

Another suitable process means are heatings in the construction container wall (300) and/or in the construction platform (301). On the one hand, these can introduce heat to the process; on the other hand, by active insulation, they can reduce heat losses.

Such heatings may be provided, for example, as electric resistance heatings. They can be controlled via standard control devices. For this purpose, sheets are commonly used, for example, which can be glued onto metallic surfaces, such as the construction container walls. The same effect is provided by heating cartridges which are inserted into bores in metallic plates.

In the case of poor insulation, power outputs of up to 5 W/cm$^2$ are required for temperatures up to approx. 90° C. Depending on the insulation quality, enormous amounts of energy can be saved here.

Further, active insulation can be carried out using a heat transfer medium. The heat transfer medium, for example water or oil, may be transported in tubes, which are usually made of copper, extend within the job box wall and the job box floor in a contacting manner and preferably extend in a meandering manner so as to achieve the most uniform heating of the box possible.

Passive insulations are also useful for temperature control in the construction container. In this case, different "materials", such as those also common in the construction industry, can be used: Mineral insulations, plastic materials, foams, but also air, vacuum etc. The passive insulations are installed such that the heat flow from the construction container is reduced.

Another essential means of the device is its control unit. The control unit determines the temperature control within the device. For this purpose, means for detecting important temperature parameters may be present in the device. This allows control circuits to be provided. A simple variant is the control of the power input into the device. In this case, a higher power input takes place during the warm-up phase of the machine. The power is gradually reduced during the ongoing production process.

In the above-described device with a 9.5 kW radiator, for example, the power is reduced from 100% to 70% during the first 3 hours of the construction process. With this power, the entire process is carried out after reaching stationary conditions.

The combination of heating elements and insulation must be adapted so as to achieve an homogeneous temperature field (e.g. FIG. 5d) in the powder cake. The required homogeneity depends on the binder system. A certain threshold must definitely be exceeded to ensure reliable curing of the binding agent.

In general, the selected temperature must not be too high, because otherwise the printing and construction process will be affected. The construction field surface temperature should not exceed 90° C. here. In order to achieve sufficient strength, the temperature must be above 80° C. In other words, the temperature has to be within a 10K range.

If the temperature distribution becomes very inhomogeneous (FIG. 5c), the isothermal lines (510-514) within which a solidification reaction is bound to happen, are shifted far towards the centre of the construction container. This considerably reduces the useful construction space.

Figure 7:
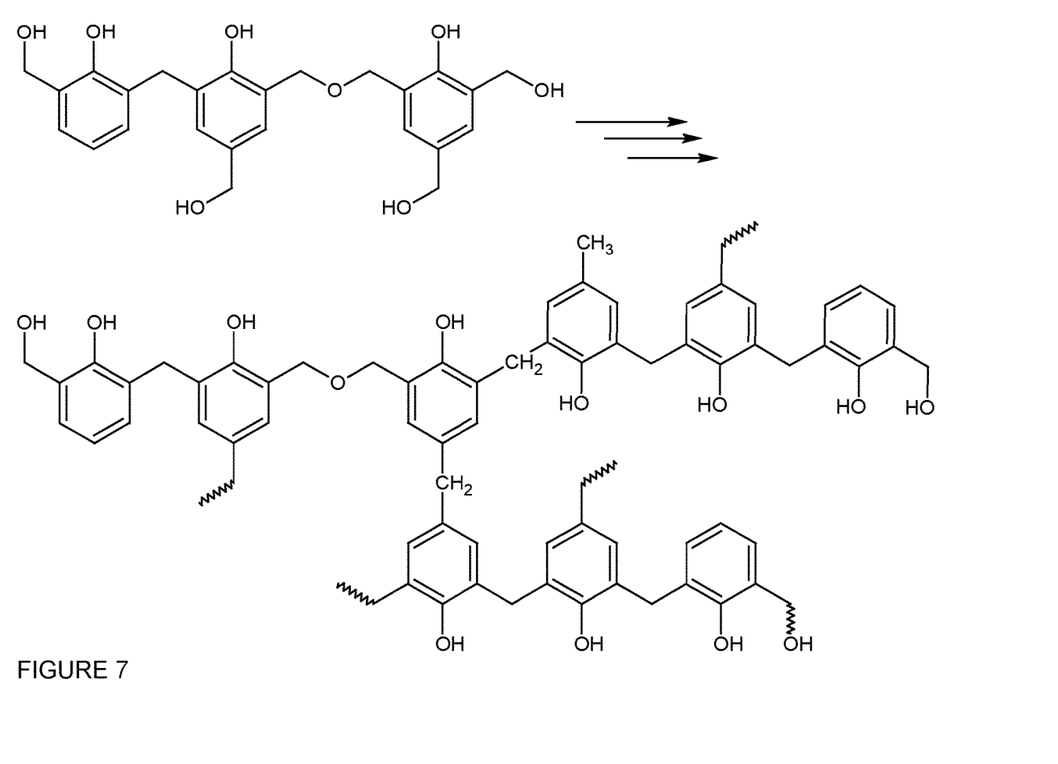
FIG. 7: Condensation reaction of resol to cross-linked resite

The binding agent system is a heat-curable pre-polymeric resol resin solution and/or novolac solution, which reacts at the already described conditions, partly or fully during the construction process into an insoluble and infusible resite. The temperature control throughout the construction process is selected such that curing does not take place ad hoc, but over a period of several hours, allowing interlaminar bonding. (FIG. 7)

Figure 6:
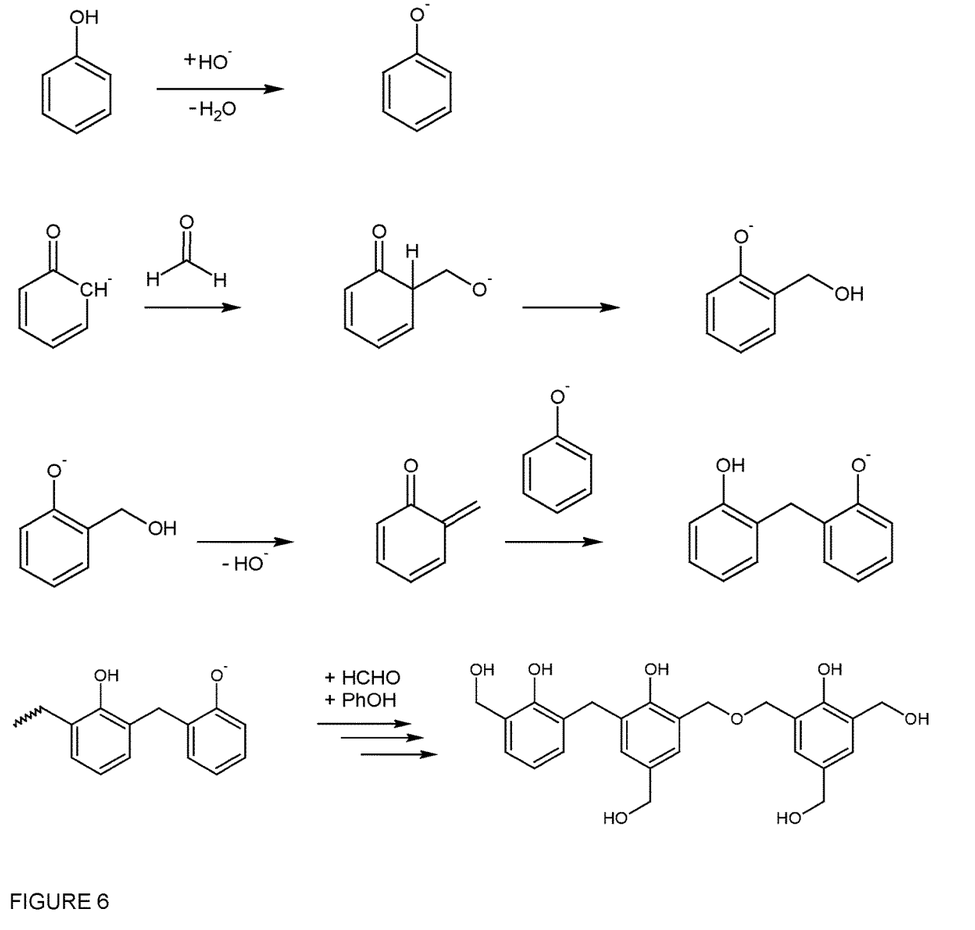
FIG. 6: Preparation of the prepolymer as exemplified by a resol

Resols and novolacs are prepolymers of a phenol-formaldehyde co-condensate. Resols are prepolymers which are polymerized with phenol under alkaline conditions with an excess of formaldehyde. (FIG. 6)

Resols include an increased number of free hydroxyl groups which tend to condensate further under temperature influence and form an insoluble resite.

Novolacs are prepolymers synthesized under acidic conditions with a shortage of formaldehyde and co-condensed with resol to resite under temperature influence or polymerized with addition of a formaldehyde donor (e.g. urotropine) and temperature increase.

Due to its production process, the prepolymer contains residual monomers of phenol and formaldehyde. The phenol content is preferably below 5% and particularly preferably below 1%.

The formaldehyde content is preferably below 0.3%, particularly preferably below 0.1%.

By adding a solvent, which consists of mono- and/or polyalcohols and/or water or exclusively of water, the binder is diluted or adjusted, respectively, to such an extent that the viscosity is in the range of 5-20 mPas, preferably between 5-10 mPas and particularly preferably between 5-8 mPas.

For viscosity fine adjustment, further modifiers may be used, such as polyvalent alcohols like glycol, propanediol or propylene glycols, further carboxymethylcelluloses, xylitol, sorbite or gum arabic. Preferably, 1%-9%, particularly preferably 3%-7%, are used.

For surface tension adjustment, common surfactants, such as sodium lauryl sulfate or sodium laureth sulfate as well as fluorine-containing and silicone-based surfactants, may be used.

The binder liquid usually consists of 30%-40% prepolymer, 60%-70% solvent and 1%-7% viscosity modifier.

The binder input can be adjusted over a wide range according to the desired final strength and loss on ignition. Usually, the input and temperature control are selected such that the green strength is not below 280 N/cm$^2$ to ensure safe handling of the components. If the condensation reaction is not fully achieved during the construction process, a subsequent oven process may complete the reaction. Preferably, the components are subsequently baked for 1-4 h at 120°

C.-150° C., particularly preferably 2-3 h at 130° C.-140° C. Any solvent still remaining will also be completely expelled by this operation.

Usually, inputs of 5%-8% by weight of the particulate material are used, which make a sufficient green strength and a high final strength accessible.

The examples describe preferred embodiments, without being construed as limiting.

EXAMPLES

Example 1

Binder mixture: Resol/novolac-prepolymer 35%, water/i-propanol (80/20) 63%, 1,2-propanediol 3%
Input: 5.8% by weight
Particulate material: AFS 100 silica sand
Green strength: 380N/cm$^2$
Final strength: 540N/cm$^2$ (after 3 h @ 135° C.)
Loss on ignition: 2%

LIST OF REFERENCE NUMERALS 100 inkjet print head
101 powder coater
102 construction platform
103 component
104 construction field edge
107 powder layers
200 heat source
300 Resistance heating/liquid heating/air heating for the container wall
301 Resistance heating/liquid heating/air heating for the construction platform
302 hot air blower
303 static heaters
304 Resistance heating with contacting element
400 Binder/binding agent system
401 Powder particles
500 Energy input onto the construction field surface
501 Energy input into the powder cake through the construction container wall
502 Energy input into the powder cake through the construction platform
503 Energy loss from the construction field surface
504 Energy loss of the powder cake through the construction container wall
505 Energy loss of the powder cake through the construction platform
510 Isothermal line in the powder cake for 90° C.
511 Isothermal line in the powder cake for 80° C.
512 Isothermal line in the powder cake for 70° C.
513 Isothermal line in the powder cake for 60° C.

What is claimed is:

1. A method for the layered construction of components, wherein a particulate material is applied onto a construction area in a construction space layer by layer with a layer thickness, a binder is selectively applied, a temperature in the construction space or/and in the particulate material applied is adjusted to at least 80° C., and the steps of material application and binder application are repeated until a desired component is obtained, wherein the temperature is maintained for at least 2 hours, with the areas onto which the binder was selectively applied solidifying and forming the components.

2. The method of claim 1, wherein the binder used is a binder system comprising:
   i) one or more monomers,
   ii) one or more oligomers or polymers, and
   iii) a solvent.

3. The method of claim 2, wherein the solvent is an aqueous or alcoholic solvent.

4. The method of claim 1, wherein the component thus obtained is subjected to further processing steps.

5. The method of claim 1, wherein the temperature is adjusted to 80 to 150° C.

6. The method of claim 5, wherein a substantially homogeneous temperature is adjusted and maintained in an area of the applied particulate material.

7. The method of claim 6, wherein the temperature is maintained for 3 to 10 hours.

8. The method of claim 7, wherein the particulate material is a plastic material, a sand, a ceramic material or a metal.

9. The method of claim 8, wherein the particulate material has an average grain size of at least 8 μm.

10. The method of claim 9, wherein the layer thickness is 50 to 800 μm.

11. The method of claim 1, wherein the particulate material consists of particles.

12. A method for the layered construction of components, wherein a particulate material consisting of particles is applied onto a construction area in a construction space layer by layer with a layer thickness, a binder is selectively applied, the temperature in the construction space or/and in the particulate material applied is adjusted to a desired temperature, and the steps of material application and binder application are repeated until a desired component is obtained, wherein the temperature in the construction space or in the material applied is adjusted to at least 70° C. and maintained for at least 2 hours, with the areas onto which the binder was selectively applied solidifying and forming the components.

13. The method of claim 12, wherein the binder used is a binder system comprising:
   i) one or more monomers,
   ii) one or more oligomers or polymers, and
   iii) a solvent.

14. The method of claim 12, wherein
   a homogeneous temperature is adjusted and maintained in an area of the applied particulate material; the homogenous temperature is maintained for 3 to 10 hours;
   the particulate material has an average grain size of at least 8 μm,
   the layer thickness is 50 to 800 μm; and
   the binder includes an aqueous solvent.

15. The method of claim 12, wherein the particulate material is a plastic material.

16. The method of claim 12, wherein the particulate material is a sand, a ceramic material or a metal.

17. The method of claim 12, wherein the binder includes a phenol-formaldehyde co-condensate having below 5% residual phenol and below 0.3% residual formaldehyde.

* * * * *